(12) United States Patent  
Miyazaki et al.

(10) Patent No.: US 8,094,089 B2
(45) Date of Patent: Jan. 10, 2012

(54) CONTENT DISPLAY SYSTEM AND CONTENT DISPLAY METHOD

(75) Inventors: Akira Miyazaki, Kawasaki (JP); Toru Ozaki, Kawasaki (JP); Masanobu Hatanaka, Kawasaki (JP); Hirohisa Naito, Kawasaki (JP); Takahiro Kii, Kawasaki (JP); Kazumi Kubota, Kawasaki (JP); Yuji Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/923,573

(22) Filed: Sep. 28, 2010

(65) Prior Publication Data

US 2011/0012811 A1 Jan. 20, 2011

Related U.S. Application Data

(63) Continuation of application No. PCT/JP2008/056394, filed on Mar. 31, 2008.

(51) Int. Cl.
*G09G 5/00* (2006.01)
(52) U.S. Cl. ............................. 345/1.1; 345/2.1; 345/9
(58) Field of Classification Search ............ 345/1.1–1.2, 345/2.1–2.3, 9, 87, 100, 204, 211; 705/14.46, 705/14.51, 14.52
See application file for complete search history.

(56) References Cited

U.S. PATENT DOCUMENTS

| 6,466,183 | B1 * | 10/2002 | Yamamoto et al. ............. 345/1.1 |
| 6,693,614 | B2 * | 2/2004 | Kamiya et al. .................. 345/89 |
| 6,714,172 | B2 * | 3/2004 | Matsuzaki et al. ............. 345/1.1 |
| 2003/0050979 | A1 | 3/2003 | Takahashi |
| 2006/0028398 | A1 * | 2/2006 | Willmore ....................... 345/2.3 |

FOREIGN PATENT DOCUMENTS

| JP | 2003-323458 | 11/2003 |
| JP | 2004-178330 | 6/2004 |
| JP | 2004-185456 | 7/2004 |
| WO | 01/63503 A1 | 8/2001 |

OTHER PUBLICATIONS

International Search Report for PCT/JP2008/056394, mailed Jun. 3, 2008.
Written Opinion of the International Searching Authority, International Application No. PCT/JP2008/056394, mailed on Mar. 6, 2008.

\* cited by examiner

*Primary Examiner* — Alexander S Beck
*Assistant Examiner* — Mansour M Said
(74) *Attorney, Agent, or Firm* — Staas & Halsey LLP

(57) ABSTRACT

A display control device includes: a priority order searching unit that searches a priority order management table to retrieve the priority level corresponding to the standby content screen that has stopped being displayed on a display device related to a usage starting operation when the usage starting operation is detected from any of display devices in the standby state; a switch display target designating unit that retrieves display devices displaying standby content screens of lower priority levels than the retrieved standby content screen, and designates a display device as the switch display target that is the display device displaying the standby content screen of the lowest priority level; and a display control unit that causes the designated display device of the switch display target to switchingly display the standby content screen that has stopped being displayed on the display device related to the usage starting operation.

16 Claims, 11 Drawing Sheets

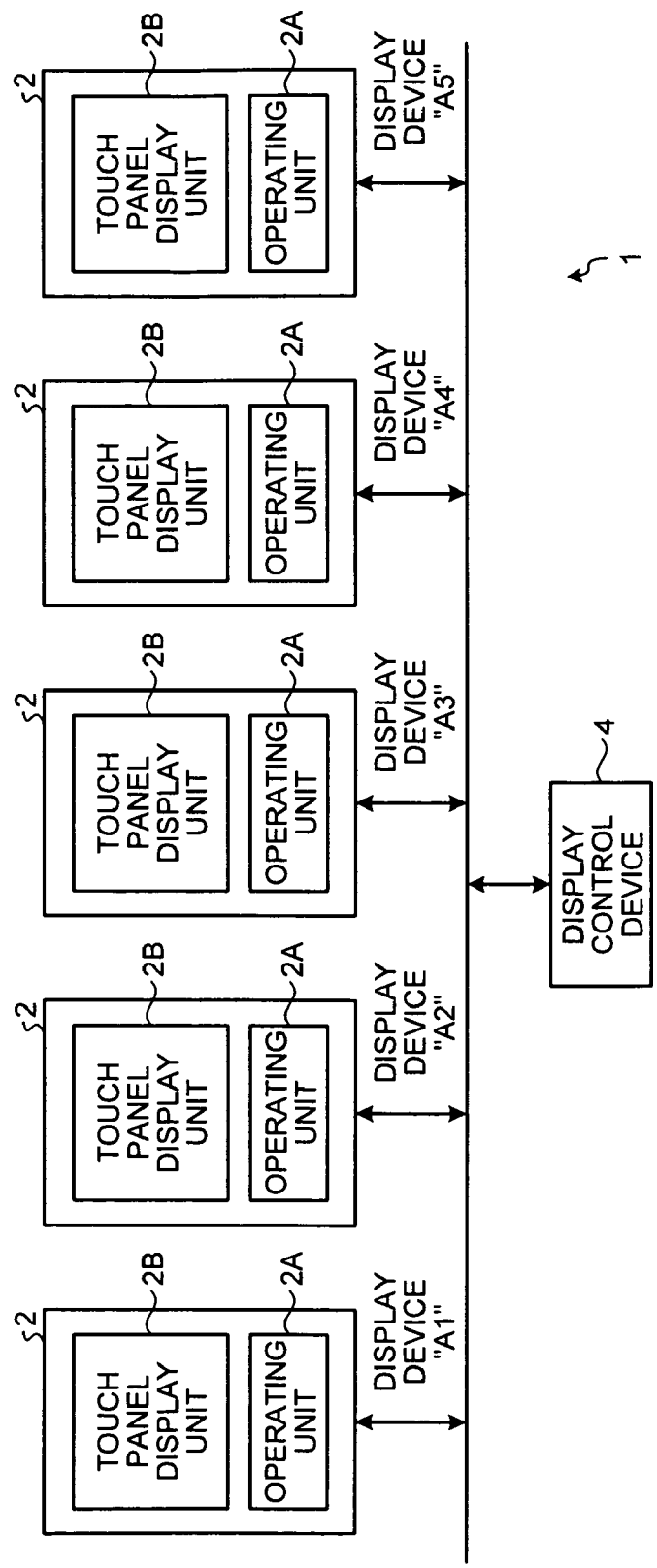

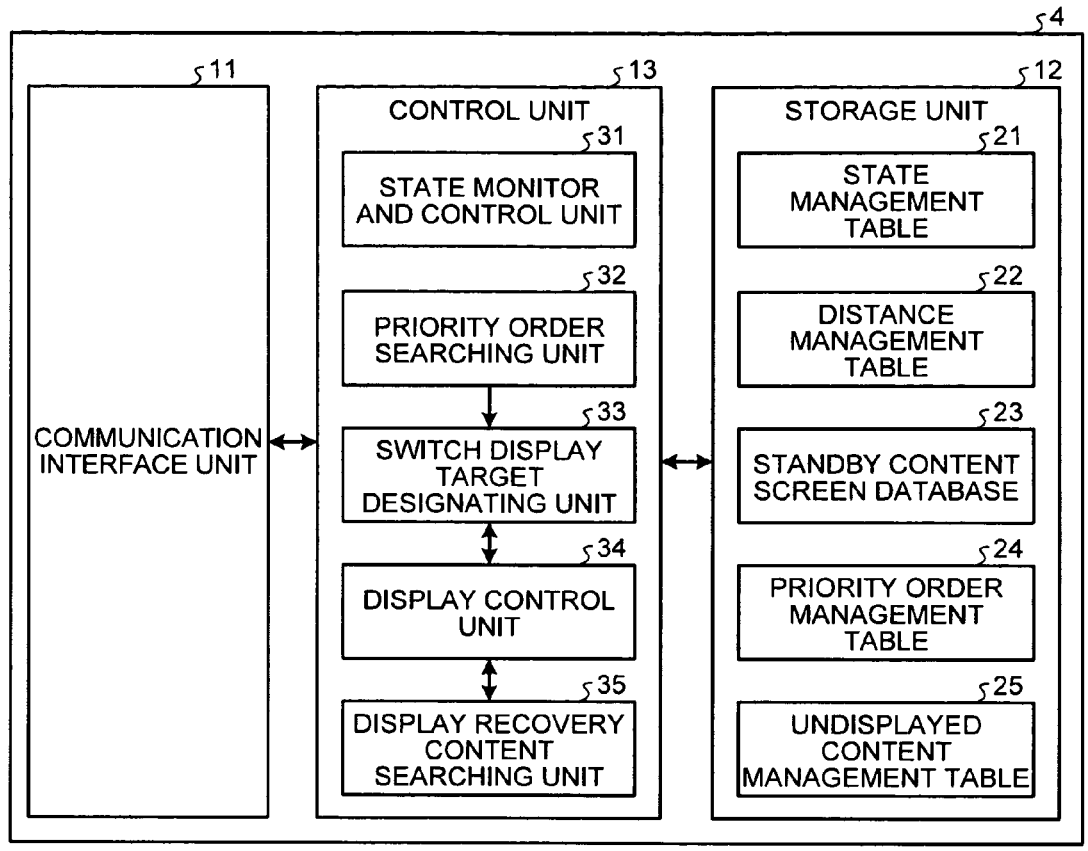

CONTENT DISPLAY SYSTEM AND CONTENT DISPLAY METHOD

CROSS-REFERENCE TO RELATED APPLICATION

This application is a continuation of International Application No. PCT/JP2008/056394, filed on Mar. 31, 2008, the entire contents of which are incorporated herein by reference.

FIELD

The embodiments discussed herein are directed to a content display system.

BACKGROUND

A content display system has widely spread. Display devices included in the content display system such as interactive display devices displaying various content screens are placed at various spots in a site, and various kinds of information is supplied to a large indefinite number of users in the site in accordance with the content screens being displayed on the display devices or various operations based on the content screens. Such systems have widely spread.

There is a known conventional content display system that includes display devices and a display control device that manages and controls the display devices. The display control device causes each display device in a standby state to display an arbitrary standby content screen selected from standby content screens such as content screens for adult males, content screens for adult females, and content screens for children. When a usage starting operation is detected from one of the display devices, the display control device causes the display device to stop displaying the currently displayed standby content screen (according to Japanese Laid-open Patent Publication Nos. 2003-323458 and 2004-185456, for example).

By the above conventional content display system, however, a standby content screen is set for each of the display devices. When a usage starting operation is detected from a display device that is in a standby state and is displaying an arbitrary standby content screen, the display of the standby content screen on this display device is ended. If the standby content screen has a high degree of importance, and there is only one display device displaying this standby content screen, for example, users might lose the opportunities for viewing this important standby content screen due to the usage start of this display device.

SUMMARY

According to an aspect of an embodiment of the invention, a content display system includes a plurality of display devices; a display control device that controls the display devices to display any of a plurality of standby content screens on the respective display devices that are in a standby state, the display control device controlling the display devices to stop displaying a standby content screen being currently displayed when detecting a usage starting operation from the display devices; a priority order managing unit that manages priority levels of standby content screens to be preferentially displayed on the display devices that are in the standby state; a state managing unit that manages a usage state of each of the display devices, and manages a standby content screen being currently displayed when the usage state is the standby state; a priority order searching unit that, when detecting a usage starting operation from the display device that is in the standby state, searches the state managing unit to retrieve a standby content screen that has stopped being displayed on the display device related to the usage starting operation, and searches the priority order managing unit to retrieve a priority level corresponding to the retrieved standby content screen; a display target designating unit that searches the priority order managing unit to retrieve standby content screens of lower priority levels than the priority level of the standby content screen retrieved by the priority order searching unit, searches the state managing unit to retrieve display devices displaying the retrieved standby content screens of lower priority levels, and designates a display device of a display target that is a display device displaying the standby content screen of the lowest priority level among the retrieved display devices; and a display control unit that controls the display device of the display target designated by the display target designating unit to display the standby content screen that has stopped being displayed on the display device related to the usage starting operation.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a block diagram schematically illustrating the inner structure of a content display system according to a first embodiment;

FIG. 2 is a block diagram schematically illustrating the inner structure of a display control device according to the first embodiment;

FIG. 3 is a diagram for briefly explaining the table contents of a state management table stored in the storage unit of the display control device according to the first embodiment;

DESCRIPTION OF EMBODIMENTS

Figure 4:
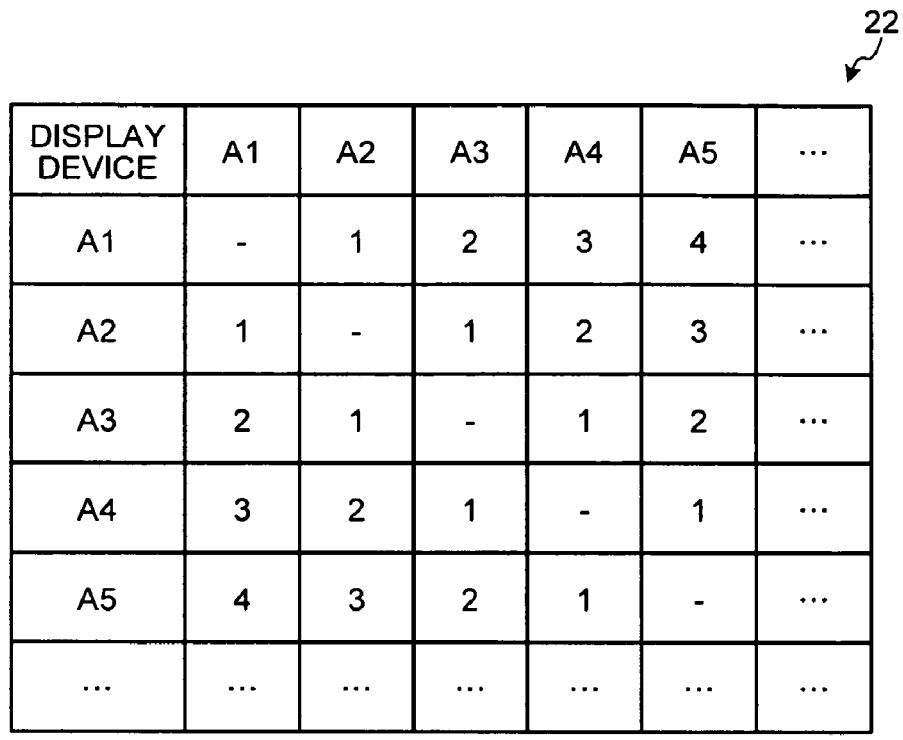
FIG. 4 is a diagram for briefly explaining the table contents of a distance management table stored in the storage unit of the display control device according to the first embodiment.

Preferred embodiments of the present invention will be explained with reference to accompanying drawings.

First, the embodiments of the present invention are outlined. A priority level is assigned to each standby content screen. When a usage starting operation is detected from one of the display devices in a standby state, the priority level corresponding to the standby content screen that has stopped being displayed on the display device related to this usage starting operation is retrieved, and the display devices displaying the standby content screens of lower priority levels than the retrieved priority level of the standby content screen are retrieved. The display device displaying the standby content screen of the lowest priority level among the retrieved display devices is designated as the display device of the display target. The standby content screen that has stopped being displayed on the display device related to the usage starting operation is then displayed on the designated display device of the display target. Accordingly, even if there is only one display device displaying a standby content screen of a high priority level, and the display of the standby content screen of the high priority level on the display device is ended due to a usage starting operation on the display device, for example, it is possible to secure the opportunities for viewing the standby content screen of the high priority level on the users' side.

[a] First Embodiment

FIG. 1 is a block diagram schematically illustrating the inner structure of a content display system according to a first embodiment.

A content display system 1 illustrated in FIG. 1 includes interactive display devices (hereinafter referred to simply as the display devices) 2, and a display control device 4 that manages and controls the display devices 2 ("A1" through "A5") via a LAN (Local Area Network) 3. The display control device 4 causes each of the display devices 2 in a standby state to display an arbitrary one of standby content screens. When detecting a usage starting operation from one of the display devices 2, the display control device 4 ends the display of the standby content screen on this display device 2.

Each of the display devices 2 includes an operating unit 2A for inputting various commands, and a touch panel display unit 2B that displays a content screen. A user can of course input various kinds of information through the operating unit 2A, and can also input various kinds of information through the content screen displayed on the touch panel display unit 2B.

Each of the display devices 2 has two kinds of usage states: a "standby" state and an "in-use" state. In the "standby" state, an arbitrary standby content screen is displayed on the touch panel display unit 2B. In the "in-use" state, the application screen is displayed on the touch panel display unit 2B.

Each of the display devices 2 switches its usage state from the "standby" state to the "in-use" state due to a usage starting operation through the operating unit 2A or the touch panel display unit 2B, and switches its usage state from the "in-use" state to the "standby" state due to a usage ending operation through the operating unit 2A or the touch panel display unit 2B.

Examples of standby content screens include content screens for adult males, content screens for adult females, content screens for children, each screen containing advertisements and guidance information. The content screens for adults each have its operation screen laid out on an upper portion of the screen to match the height of each adult. The content screens for children each have its operation screen laid out on a lower portion of the screen to match the height of each child.

FIG. 2 is a block diagram schematically illustrating the inner structure of the display control device 4 according to the first embodiment.

The display control device 4 illustrated in FIG. 2 includes a communication interface 11 that communicates and connects with the display devices 2 via the LAN 3, a storage unit 12 that stores various kinds of information about the display control device 4, and a control unit 13 that controls the entire display control device 4.

The storage unit 12 includes: a state management table 21 that manages the usage states of the display devices 2 to be managed; a distance management table 22 that manages distances among the display devices 2; a standby content screen database 23 that stores the standby content screens to be displayed on the screens of the display devices 2; a priority order management table 24 that manages the degrees of importance of the standby content screens, or the priority levels of the standby content screens to be preferentially displayed on the display devices 2 in the standby state; and an undisplayed content management table 25 that manages the standby content screens not being displayed among the display devices 2 as undisplayed content.

FIG. 3 is a diagram for briefly explaining the table contents of the state management table 21 stored in the storage unit 12 of the display control device 4 according to the first embodiment.

As illustrated in FIG. 3, the state management table 21 manages the usage state of each of the display devices 2 to be managed, and also manages display content information that is the standby content screen displayed on each display device 2 having its usage state as the "standby" state.

For ease of explanation, the state management table 21 is described as a table that manages the display devices 2 associated with standby content screens in the above description. However, the state management table 21 does not directly manage the display devices 2 and the standby content screens, but of course manages the display device identification names that identify the display devices 2 associated with the content identification names that identify the standby content screens.

Based on the table contents of the state management table 21 illustrated in FIG. 3, the control unit 13 can recognize that the usage state of the display device 2 of "A1" is in the "standby" state, and is displaying the standby content screens of "C5", for example.

FIG. 4 is a diagram for briefly explaining the table contents of the distance management table 22 stored in the storage unit 12 of the display control device 4 according to the first embodiment.

As illustrated in FIG. 4, the distance management table 22 manages the distances from each display device 2 to the other display devices 2. Based on the table contents of the distance management table 22 illustrated in FIG. 4, the control unit 13 can recognize that, to the display device 2 of "A1", the display device 2 of "A2" having the level "1" is the closest, the display device 2 of "A3" having the level "2" is the second closest, the display device 2 of "A4" having the level "3" is the third closest, and the display device 2 of "A5" having the level "4" is the fourth closest.

Figure 5:
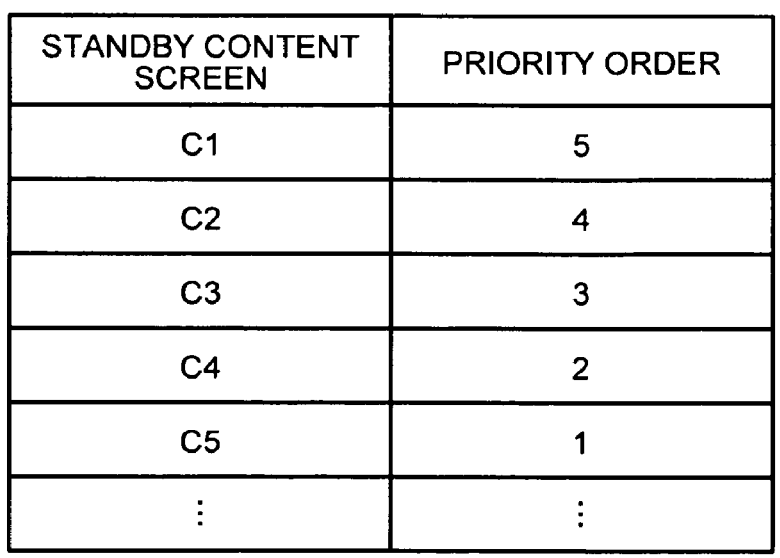
FIG. 5 is a diagram for briefly explaining the table contents of a priority order management table stored in the storage unit of the display control device according to the first embodiment.

FIG. 5 is a diagram for briefly explaining the table contents of the priority order management table 24 stored in the storage unit 12 of the display control device 4 according to the first embodiment.

As illustrated in FIG. 5, the priority order management table 24 manages the priority level 24B of each standby content screen to be preferentially displayed on the display devices 2 in the standby state.

For ease of explanation, the priority order management table 24 is described as a table that manages the standby content screens associated with the priority levels in the above description. However, the priority order management table 24 does not directly manage the standby content screens, but of course manages the priority level for each of the content identification names that identify the standby content screens.

Based on the table contents of the priority order management table 24 illustrated in FIG. 5, the control unit 13 manages the priority order of "C5"→"C4"→"C3"→"C2"→"C1", and can recognize that the standby content screen of "C5" has the highest priority level or has the highest degree of importance, and the standby content screen of "C4" has the second highest priority level or has the second highest degree of importance.

The control unit 13 illustrated in FIG. 2 includes: a state monitor and control unit 31 that monitors and controls the display devices 2 through the communication interface 11 via the LAN 3; and a priority order searching unit 32 that searches the priority order management table 24 to retrieve the priority level of the standby content screen being displayed on the display device 2 to be started to use, when a usage starting operation is detected on the side of the display devices 2 in the standby state through the state monitor and control unit 31.

The state monitor and control unit 31 monitors each of the display devices 2, and, based on the results of the monitoring, updates the state management table 21 that manages the usage state of each of the display devices 2.

When detecting a usage starting operation from a display device 2 among the display devices 2 in the standby state, the priority order searching unit 32 searches the state management table 21 to retrieve the standby content screen that has stopped being displayed, based on display content information 21C corresponding to the display device 2 related to the usage starting operation.

The priority order searching unit 32 searches the priority order management table 24 to retrieve the priority level corresponding to the retrieved standby content screen.

The control unit 13 includes: a switch display target designating unit 33 that designates a display device 2 of a switch display target to switchingly display a standby content screen, based on the priority level retrieved by the priority order searching unit 32; and a display control unit 34 that causes the display device 2 of the switch display target designated by the switch display target designating unit 33 to switchingly display the standby content screen that has stopped being displayed on the display device 2 related to a usage starting operation.

The switch display target designating unit 33 searches the priority order management table 24 to retrieve the standby content screens of lower priority levels, or lower degree of importance than the standby content screen retrieved by the priority order searching unit 32, and searches the state management table 21 to retrieve the display devices 2 displaying the retrieved standby content screens each having a lower priority level.

In a case where there is only one display device 2 that is displaying the standby content screen of the lowest priority level among the retrieved display devices 2, the switch display target designating unit 33 designates this display device 2 as the display device 2 of the switch display target.

In a case where there are two or more display devices 2 that are displaying the standby content screen of the lowest priority level among the retrieved display devices 2, the switch display target designating unit 33 designates the display device 2 of the switch display target that is the display device 2 located at the shortest distance from the display device 2 related to the usage starting operation among the two or more display devices 2, based on the table contents of the distance management table 22.

After the switch display target designating unit 33 designates the display device 2 of the switch display target, the display control unit 34 causes the designated display device 2 of the switch display target to switchingly display the standby content screen that has stopped being displayed on the display device 2 related to the usage starting operation.

The control unit 13 further includes a display recovery content searching unit 35 that retrieves a standby content screen to be displayed on the display device 2 related to a usage ending operation, when the usage ending operation on the side of the display devices 2 in the "in-use" state is detected through the state monitor and control unit 31.

When detecting a usage ending operation on the side of the display devices 2 in the "in-use" state, the display recovery content searching unit 35 determines whether there are standby content screens being managed in the undisplayed content management table 25. If there are standby content screens being managed in the undisplayed content management table 25, the display recovery content searching unit 35 retrieves the standby content screen that has the highest priority level among those standby content screens.

The display control unit 34 causes the display device 2 related to the usage ending operation to display the standby content screen of the highest priority level retrieved by the display recovery content searching unit 35.

If there is not a standby content screen being managed in the undisplayed content management table 25 searched by the display recovery content searching unit 35, the display control unit 34 causes the display device 2 related to the usage ending operation to display an arbitrary standby content screen according to the priority order.

The structure according to the first embodiment has been described so far, and the correspondence between the components of the first embodiment and the components claimed in the claims is now described. The content display system in the claims is equivalent to the content display system 1, the display devices are equivalent to the display devices 2, the display control device is equivalent to the display control device 4, the priority order managing unit is equivalent to the priority order management table 24, the state managing unit is equivalent to the state management table 21, the priority order searching unit is equivalent to the priority order searching unit 32, the display target designating unit is equivalent to the switch display target designating unit 33, the display control unit is equivalent to the display control unit 34, the distance managing unit is equivalent to the distance management table 22, the undisplayed content managing unit is equivalent to the undisplayed content management table 25, and the display recovery content searching unit is equivalent to the display recovery content searching unit 35.

Figure 6:
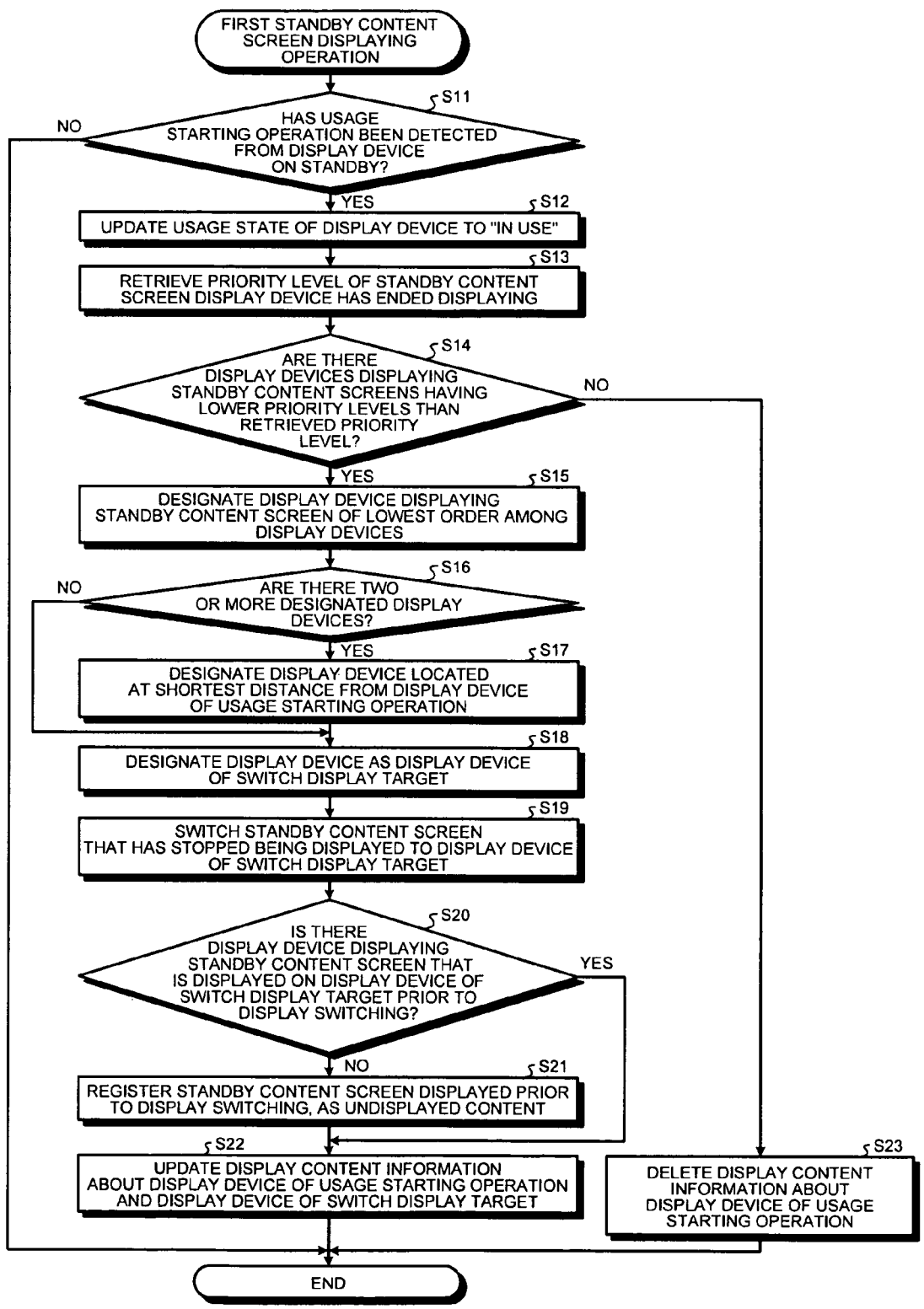
FIG. 6 is a flowchart illustrating the procedures to be carried out by a control unit involved in a first standby content screen displaying operation of the display control device according to the first embodiment.

Next, the operation of the content display system 1 according to the first embodiment is described. FIG. 6 is a flowchart illustrating the procedures to be carried out by the control unit 13 involved in a first standby content screen displaying operation of the display control device 4 according to the first embodiment.

The first standby content screen displaying operation illustrated in FIG. 6 is an operation to be performed when a usage starting operation is detected from a display device 2 in the "standby" state. In this operation, the standby content screen that has stopped being displayed on this display device 2 is switchingly displayed on a display device 2 displaying a standby content screen of a lower priority level than the standby content screen that has stopped being displayed.

In FIG. 6, the state monitor and control unit 31 in the control unit 13 determines whether a usage starting operation has been detected from a display device 2 in the "standby" state via the LAN 3 (step S11).

When detecting a usage starting operation ("Yes" in step S11), the state monitor and control unit 31 ends the display of the standby content screen on the display device 2 related to the usage starting operation, and updates the usage state of this display device 2 from "on standby" to "in use" in the state management table 21 (step S12).

Even when the usage state of the display device 2 is updated from "on standby" to "in use", the state management table 21 still manages the standby content screen that has stopped being displayed on the display device 2 as the standby content screen being displayed on the display device 2.

The priority order searching unit 32 in the control unit 13 searches the state management table 21 to retrieve the stopped standby content screen corresponding to the display device 2 related to the usage starting operation, and searches the priority order management table 24 to retrieve the priority level corresponding to the retrieved standby content screen (step S13).

After retrieving the priority level of the stopped standby content screen, the switch display target designating unit 33 in the control unit 13 searches the priority order management table 24 to retrieve the standby content screens that have lower priority levels than the stopped standby content screen, and searches the state management table 21 to retrieve the display devices 2 currently displaying the retrieved standby content screens that have lower priority levels. Based on the search result, the switch display target designating unit 33 determines whether there are display devices 2 currently displaying the standby content screens that have lower priority levels (step S14).

In a case where there are display devices 2 currently displaying the standby content screens that have lower priority levels ("Yes" in step S14), the switch display target designating unit 33 designates the display device 2 displaying the standby content screen of the lowest priority level among those display devices 2 (step S15).

After designating the display device 2 displaying the standby content screen of the lowest priority level, the switch display target designating unit 33 determines whether there is more than one designated display device 2 (step S16).

If there are two or more designated display devices 2 ("Yes" in step S16), the switch display target designating unit 33 designates the display device 2 located at the shortest distance from the display device 2 related to the usage starting operation of step S11, based on the table contents of the distance management table 22 (step S17).

If the number of display devices 2 designated in step S16 is not larger than one ("No" in step S16), or the display device 2 at the shortest distance is designated in step S17, the switch display target designating unit 33 designates the designated display device 2 as the display device 2 of the switch display target (step S18).

The display control unit 34 in the control unit 13 causes the display device 2 of the switch display target to switchingly display the standby content screen that has stopped being displayed on the display device 2 related to the usage starting operation of step S11 (step S19). As a result, even though the standby content screen stops being displayed due to the usage starting operation on the display device 2, this standby content screen is displayed on the display device 2 of the switch display target.

After the standby content screen is switchingly displayed on the display device 2 of the switch display target, the state monitor and control unit 31 determines whether there is a display device 2 currently displaying the standby content screen that is displayed on the display device 2 of the switch display target prior to the display switching, based on the table contents of the state management table 21 (step S20).

If there is not a display device 2 currently displaying the standby content screen that is displayed on the display device 2 of the switch display target prior to the display switching ("No" in step S20), the state monitor and control unit 31 determines that all the display devices 2 are not displaying the standby content screen displayed prior to the display switching, and registers this standby content screen as undisplayed content in the undisplayed content management table 25 (step S21).

The state monitor and control unit 31 switchingly updates the display content information corresponding to the display device 2 of the switch display target in the state management table 21 to the standby content screen that is currently being displayed, and deletes the display content information corresponding to the display device 2 related to the usage starting operation in the state management table 21. By doing so, the state monitor and control unit 31 updates the state management table 21 (step S22), and ends this operation.

If the usage starting operation from a display device 2 in the "standby" state is not detected in step S11 ("No" in step S11), the state monitor and control unit 31 ends this operation.

If there is not a display device 2 currently displaying a standby content screen that has a lower priority level in step S14 ("No" in step S14), the switch display target designating unit 33 deletes the display content information corresponding to the display device 2 related to the usage starting operation in the state management table 21. By doing so, the switch display target designating unit 33 updates the state management table 21 (step S23), and this operation comes to an end.

If there is a display device 2 displaying the standby content screen displayed on the display device 2 of the switch display target prior to the display switching in step S20 ("Yes" in step S20), the state monitor and control unit 31 does not register any content in the undisplayed content management table 25, and the operation moves on to step S22.

In the first standby content screen displaying operation illustrated in FIG. 6, when a usage starting operation is detected from a display device 2 in the "standby" state, the priority level of the standby content screen being displayed on this display device 2 is retrieved. If there are display devices 2 displaying standby content screens of lower priority levels than the retrieved priority level, the display device 2 displaying the standby content screen of the lowest priority level among those display devices 2 is designated as the display device 2 of the switch display target. The standby content screen that has stopped being displayed due to the usage starting operation is then switchingly displayed on the designated display device 2. Accordingly, even in a case where only one display device 2 is displaying a standby content screen of a high priority level, and the standby content screen stops being displayed on the display device 2 due to a usage starting operation on the display device 2, it is possible to secure the opportunities for viewing the standby content screen of the high priority level on the users' side.

Also, in the first standby content screen displaying operation, when a usage starting operation is detected from a display device 2 in the "standby" state, the priority level of the standby content screen being displayed on this display device 2 is retrieved, and a check is made to determine whether there are display devices 2 displaying standby content screens of lower priority levels than the retrieved priority level. If there are display devices 2 displaying standby content screens of lower priority levels than the retrieved priority level, a check is made to determine whether there is more than one display device 2 displaying the standby content screen of the lowest priority level among those display devices 2. If there is more than one display device 2, the display device 2 located at the shortest distance from the display device 2 related to the usage starting operation is designated as the display device 2 of the switch display target. The standby content screen that has stopped being displayed due to the usage starting operation is then switchingly displayed on the designated display device 2. Accordingly, even in a case where only one display device 2 is displaying a standby content screen of a high priority level, and the standby content screen stops being displayed on the display device 2 due to a usage starting operation on the display device 2, it is possible to secure the opportunities for viewing the standby content screen of the high priority level on the users' side through the display device 2 located at the shortest distance from the display device 2 that has ended the subject display.

Figure 7:
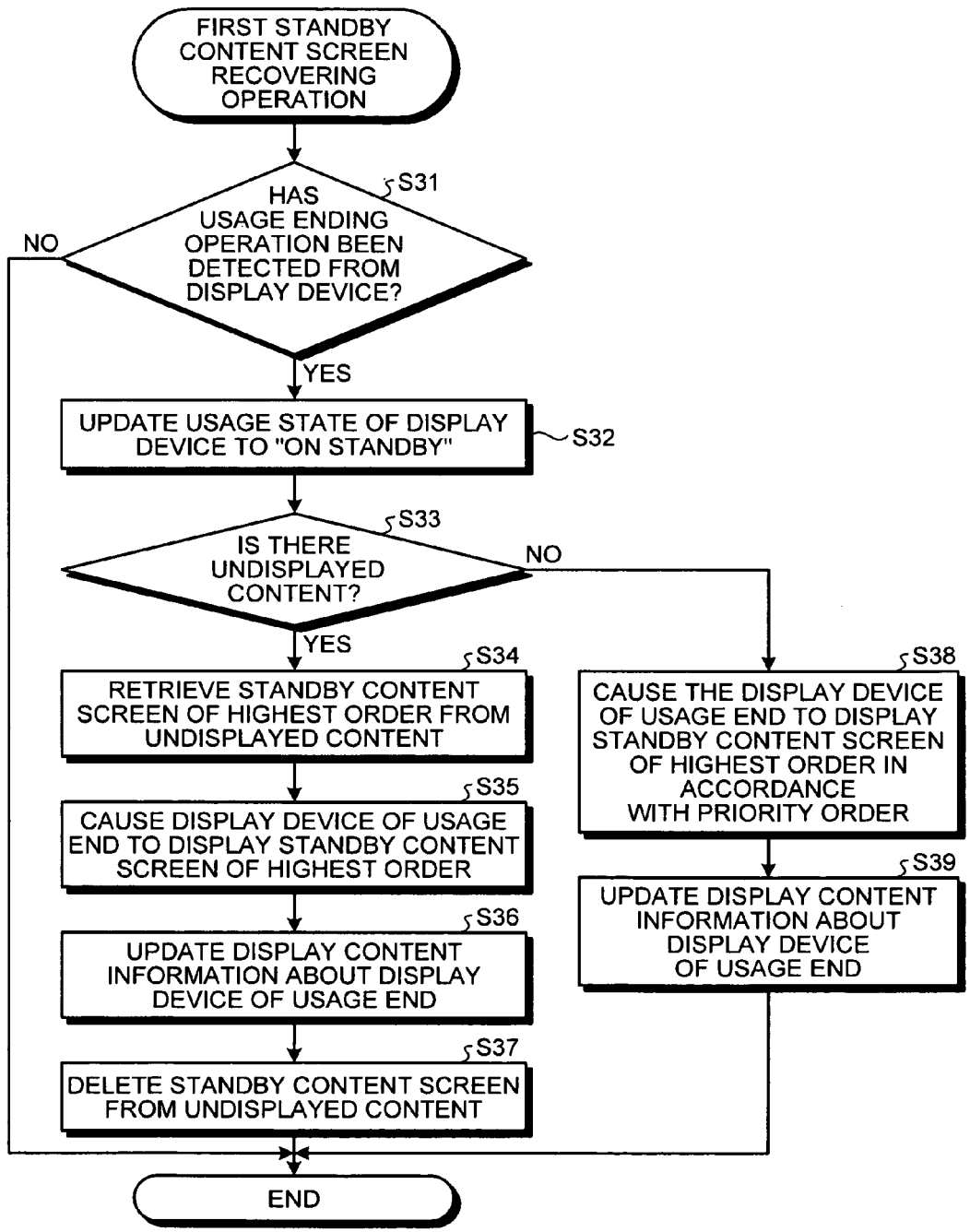
FIG. 7 is a flowchart illustrating the procedures to be carried out by the control unit involved in a first standby content screen recovering operation of the display control device according to the first embodiment.

FIG. 7 is a flowchart illustrating the procedures to be carried out in the control unit 13 involved in a first standby content screen recovering operation of the display control device 4 according to the first embodiment.

The first standby content screen recovering operation illustrated in FIG. 7 is an operation to recover a standby content screen on a display device 2, when the display device 2 shifts from "in use" to "on standby" due to a usage ending operation through the display device 2 in the "in-use" state.

In FIG. 7, the state monitor and control unit 31 in the control unit 13 determines whether a usage ending operation has been detected from a display device 2 in the "in-use" state (step S31).

If a usage ending operation has been detected from a display device 2 ("Yes" in step S31), the state monitor and control unit 31 updates the usage state of the display device 2 related to this usage ending operation from "in use" to "on standby" in the state management table 21 (step S32).

The display recovery content searching unit 35 in the control unit 13 then determines whether there is undisplayed content in the undisplayed content management table 25 (step S33).

If there is undisplayed content ("YES" in step S33), the display recovery content searching unit 35 retrieves the standby content screen of the highest priority level in the undisplayed content, based on the table contents of the priority order management table 24 (step S34).

After the standby content screen of the highest priority level is retrieved from the undisplayed content, the display control unit 34 causes the display device 2 related to the usage ending operation to display the standby content screen of the highest priority level (step S35).

After the standby content screen is displayed on the display device 2 related to the usage ending operation, the state monitor and control unit 31 registers the standby content screen being currently displayed in the display content information corresponding to this display device 2 in the state management table 21. By doing so, the state monitor and control unit 31 updates the state management table 21 (step S36).

The state monitor and control unit 31 deletes the undisplayed content corresponding to this standby content screen from the undisplayed content management table 25. By doing so, the state monitor and control unit 31 updates the undisplayed content management table 25 (step S37), and ends this operation.

If a usage ending operation has not been detected from a display device 2 in step S31 ("No" in step S31), the state monitor and control unit 31 ends this operation.

If there is no undisplayed content in step S33 ("No" in step S33), the display control unit 34 causes the display device 2 of the usage ending operation to display the standby content screen of the highest priority level in accordance with the priority order (step S38).

In the procedure of step S38, the standby content screen of the highest priority level is displayed on the display device 2 of the usage ending operation in accordance with the priority order, since all the standby content screens are displayed on the display devices 2 in the standby state. However, this selection of standby content may be arbitrarily changed.

When the standby content screen is displayed on the display device 2 of the usage ending operation, the state monitor and control unit 31 registers the standby content screen being currently displayed in the display content information corresponding to this display device 2 in the state management table 21. By doing so, the state monitor and control unit 31 updates the state management table 21 (step S39), and ends this operation.

In the first standby content screen recovering operation illustrated in FIG. 7, when a usage ending operation is detected from a display device 2 in the "in-use" state, a check is made to determine whether there is undisplayed content in the undisplayed content management table 25. If there is undisplayed content, the standby content screen of the highest priority level in the undisplayed content is displayed on the display device 2 of the usage ending operation. Accordingly, undisplayed standby content screens are minimized among the standby content screens, and it is possible to secure the opportunities for viewing the standby content screens on the users' side.

Also, in the first standby content screen recovering operation, when a usage ending operation is detected from a display device 2 in the "in-use" state, a check is made to determine whether there is undisplayed content in the undisplayed content management table 25. If there is no undisplayed content, the standby content screen of the highest priority level is displayed on the display device 2 of the usage ending operation in accordance with the priority order. Accordingly, while undisplayed standby content screens are minimized, the standby content screen of the highest priority level or having the highest degree of importance can be displayed.

Figure 8:
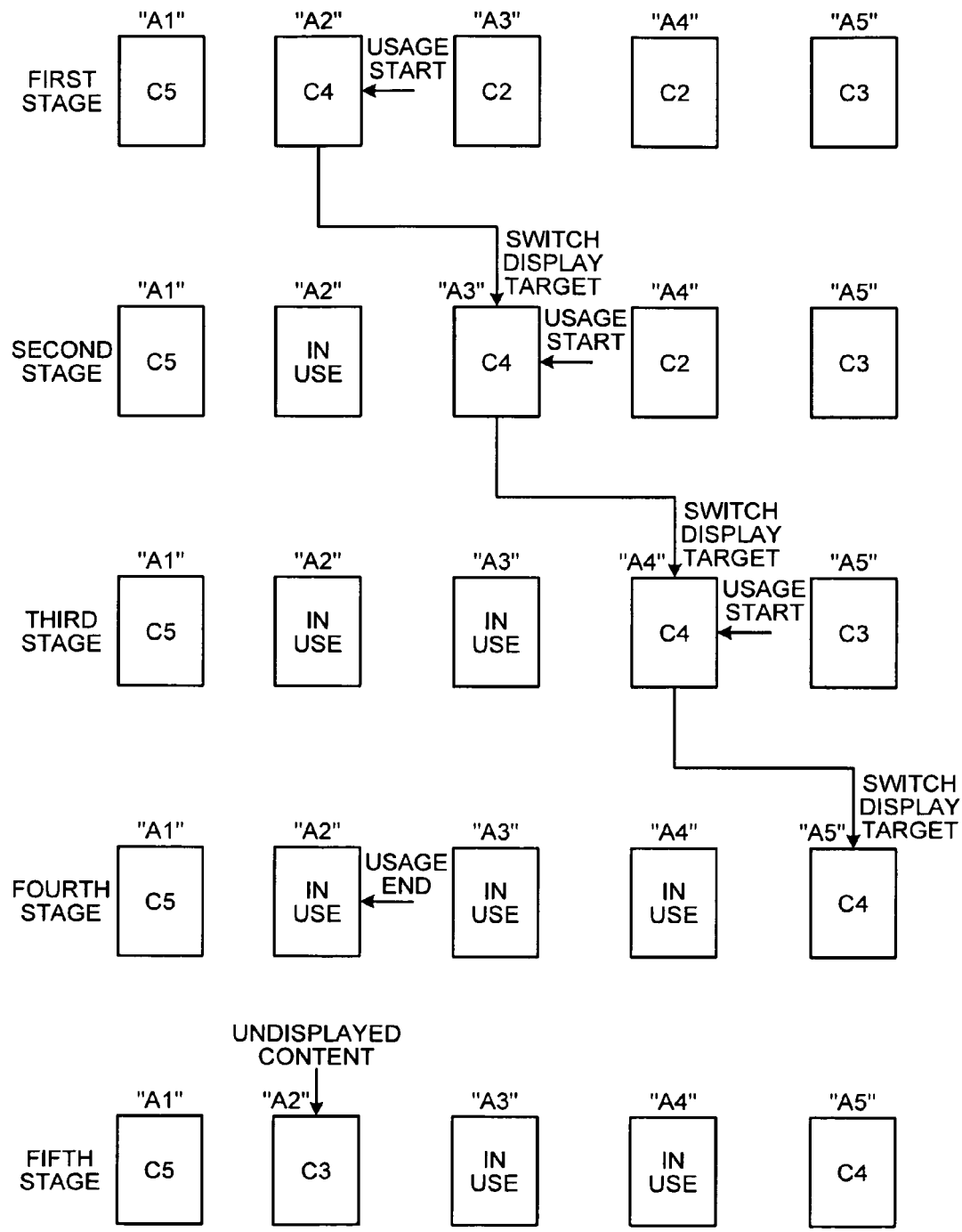
FIG. 8 is a diagram for briefly explaining the transition process of standby content screens to be displayed on the respective display devices involved in the first standby content screen displaying operation and the first standby content screen recovering operation of the display control device according to the first embodiment.

The procedures in the first standby content screen displaying operation illustrated in FIG. 6 and the first standby content screen recovering operation illustrated in FIG. 7 are now described in conjunction with the display forms of the respective display devices 2. FIG. 8 is a diagram for briefly explaining standby content screen transition processes of the respective display devices 2 in the first standby content screen displaying operation and the first standby content screen recovering operation according to the first embodiment.

As illustrated in FIG. 8, in this system, the standby content screen of "C5" is displayed on the display device 2 of "A1", the standby content screen of "C4" is displayed on the display device 2 of "A2", the standby content screen of "C2" is displayed on the display devices 2 of "A3" and "A4", and the standby content screen of "C3" is displayed on the display device 2 of "A5", for example. The usage states of all the display devices 2 of "A1" through "A5" are "on standby", and the priority order of the standby content screens is "C5"→"C4"→"C3"→"C2" in descending order.

First, when detecting a usage starting operation on the display device 2 of "A2" in the first stage illustrated in FIG. 8, the display control device 4 obtains search results that indicate the display devices 2 displaying the standby content screens of lower priority levels than the standby content screen "C4" being displayed on the display device 2 of "A2" or the standby content screens of "C3" and "C2", or the display devices 2 of "A3", "A4", and "A5".

The display control device 4 then obtains search results that indicate the display devices 2 displaying the standby content screen of the lowest priority level or the standby content screens of "C2", or the display devices 2 of "A3" and "A4" among the display devices 2 of "A3", "A4", and "A5".

The display control device 4 further designates the display device 2 of the switch display target that is the display device 2 of "A3", which is the closer to the display device 2 of "A2" related to the usage starting operation between the display devices 2 of "A3" and "A4". The display control device 4 then causes the display device 2 of "A3" as the switch display target to switchingly display the standby content screen of "C4" that has stopped being displayed on the display device 2 related to the usage starting operation or the display device 2 of "A2" (see SECOND STAGE).

As a result, even if the standby content screen of "C4" displayed on the display device 2 of "A2" stops being displayed due to a usage starting operation on this display device 2, it is possible to secure the opportunities for viewing the standby content screen of "C4" on the users' side.

When detecting a usage starting operation on the display device 2 of "A3" in the second stage, the display control device 4 obtains search results that indicate the display devices 2 displaying the standby content screens of lower priority levels than the standby content screen "C4" being displayed on the display device 2 of "A3" or the standby content screens of "C3" and "C2", or the display devices 2 of "A4" and "A5".

The display control device 4 then obtains a search result that indicates the display device 2 displaying the standby content screen of the lowest priority level or the standby content screen of "C2" between the display devices 2 of "A4" and "A5", or the display device 2 of "A4".

Since there is only a single search result, the display control device 4 further designates the display device 2 of "A4" as the display device 2 of the switch display target. The display control device 4 then causes the display device 2 of "A4" as the switch display target to switchingly display the standby content screen of "C4" that has stopped being displayed on the display device 2 related to the usage starting operation or the display device 2 of "A3" (see THIRD STAGE).

As a result, even if the standby content screen of "C4" displayed on the display device 2 of "A3" stops being displayed due to a usage starting operation on this display device 2, it is possible to secure the opportunities for viewing the standby content screen of "C4" on the users' side.

When detecting a usage starting operation on the display device 2 of "A4" in the third stage, the display control device 4 obtains a search result that indicates the display device 2 displaying the standby content screen of lower priority level than the standby content screen "C4" being displayed on the display device 2 of "A4" or the standby content screen of "C3", or the display device 2 of "A5".

The display control device 4 then obtains a search result that indicates the display device 2 displaying the standby content screen of the lowest priority level or the standby content screen of "C3", or the display device 2 of "A5".

The display control device 4 further designates the display device 2 of the switch display target that is the display device 2 of "A5", which is the single search result. The display control device 4 then causes the display device 2 of "A5" as the switch display target to switchingly display the standby content screen of "C4" that has stopped being displayed on the display device 2 related to the usage starting operation or the display device 2 of "A4" (see FOURTH STAGE).

As a result, even if the standby content screen of "C4" displayed on the display device 2 of "A4" stops being displayed due to a usage starting operation on this display device 2, it is possible to secure the opportunities for viewing the standby content screen of "C4" on the users' side.

When detecting a usage ending operation on the display device 2 of "A2" in use in the fourth stage, the display control device 4 obtains a search result that indicates the standby content screen of the highest priority level in the undisplayed content in the undisplayed content management table 25, or the standby content screen of "C3".

The display control device 4 then causes the display device 2 related to the usage ending operation or the display device 2 of "A2" to display the standby content screen of "C3" (see FIFTH STAGE). As a result, the display device 2 that has returned to the standby state displays the standby content screen of the highest priority level in the undisplayed content.

According to the first embodiment, when a usage starting operation is detected from a display device 2 in the "standby" state, the priority level of the standby content screen being displayed on this display device 2 is retrieved. If there are display devices 2 displaying standby content screens of lower priority levels than the retrieved priority level, the display device 2 displaying the standby content screen of the lowest priority level among those display devices 2 is designated as the display device 2 of the switch display target. The standby content screen that has stopped being displayed due to the usage starting operation is then switchingly displayed on the designated display device 2. Accordingly, even in a case where only one display device 2 is displaying a standby content screen of a high priority level, and the standby content screen stops being displayed on the display device 2 due to a usage starting operation on the display device 2, it is possible to secure the opportunities for viewing the standby content screen of the high priority level on the users' side.

Also, according to the first embodiment, when a usage starting operation is detected from a display device 2 in the "standby" state, the priority level of the standby content screen being displayed on this display device 2 is retrieved, and a check is made to determine whether there are display devices 2 displaying standby content screens of lower priority levels than the retrieved priority level. If there are display devices 2 displaying standby content screens of lower priority levels than the retrieved priority level, a check is made to determine whether there is more than one display device 2 displaying the standby content screen of the lowest priority level among those display devices 2. If there is more than one display device 2, the display device 2 located at the shortest distance from the display device 2 related to the usage starting operation is designated as the display device 2 of the switch display target. The standby content screen that has stopped being displayed due to the usage starting operation is then switchingly displayed on the designated display device 2. Accordingly, even in a case where only one display device 2 is displaying a standby content screen of a high priority level, and the standby content screen stops being displayed on the display device 2 due to a usage starting operation on the display device 2, it is possible to secure the opportunities for viewing the standby content screen of the high priority level on the users' side through the display device 2 located at the shortest distance from the display device 2 that has ended the subject display.

Also, according to the first embodiment, when a usage ending operation is detected from a display device 2 in the "in-use" state, a check is made to determine whether there is undisplayed content in the undisplayed content management table 25. If there is undisplayed content, the standby content screen of the highest priority level in the undisplayed content is displayed on the display device 2 of the usage ending operation. Accordingly, undisplayed standby content screens are minimized among the standby content screens, and it is possible to secure the opportunities for viewing the standby content screens on the users' side.

Also, according to the first embodiment, when a usage ending operation is detected from a display device 2 in the "in-use" state, a check is made to determine whether there is undisplayed content in the undisplayed content management table 25. If there is no undisplayed content, the standby content screen of the highest priority level is displayed on the display device 2 of the usage ending operation in accordance with the priority order. Accordingly, while undisplayed standby content screens are minimized, the standby content screen that has the highest priority level or has the highest degree of importance can be displayed.

In the above described first embodiment, when a usage starting operation is detected from a display device 2 in the "standby" state, the standby content screen that has stopped being displayed on the display device 2 due to this usage starting operation is switchingly displayed on a display device 2 displaying a standby content screen of a lower priority level than the stopped standby content screen. However, instead of one standby content screen being switchingly displayed on the touch panel display unit 2B of a display device 2, two or more standby content screens may be displayed as split screens on the touch panel display unit 2B of a display device 2. Such an embodiment is described below as a second embodiment.

[b] Second Embodiment

Figure 9:
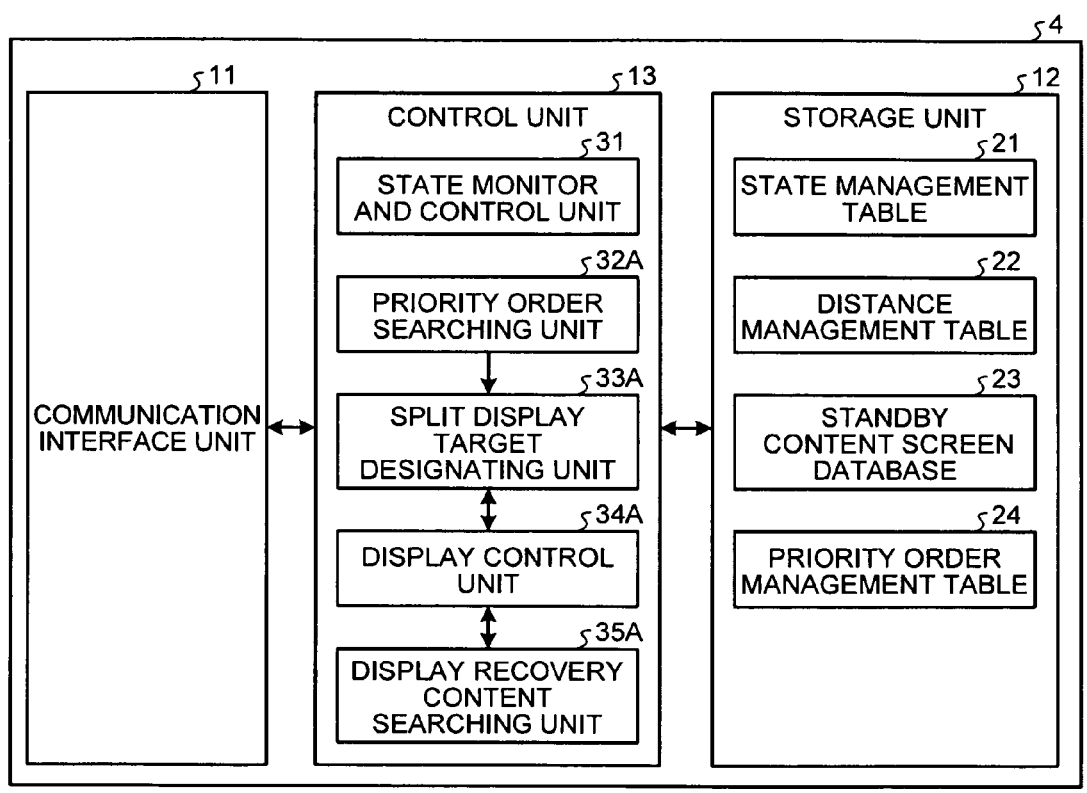
FIG. 9 is a block diagram schematically illustrating the inner structure of the display control device according to a second embodiment.

The same components as those of the first embodiment are denoted by the same reference numerals as those used in the first embodiment, and explanation of the structures and functions of them is not repeated here. FIG. 9 is a block diagram schematically illustrating the inner structure of the display control device 4 according to the second embodiment.

The display control device 4 of the second embodiment differs from the display control device 4 of the first embodiment in that the priority order searching unit 32, the switch display target designating unit 33, the display control unit 34, and the display recovery content searching unit 35 in the control unit 13 are replaced with a priority order searching unit 32A, a split display target designating unit 33A, a display control unit 34A, and a display recovery content searching unit 35A, and the undisplayed content management table 25 in the storage unit 12 is deleted, as illustrated in FIG. 9.

The control unit 13 in the display control device 4 illustrated in FIG. 9 includes the priority order searching unit 32A that searches the priority order management table 24 to retrieve the priority level of the standby content screen being displayed on a display device 2 related to a usage starting operation, when the usage starting operation is detected from the display device 2 in the "standby" state.

When a usage starting operation is detected from an arbitrary display device 2 among the display devices 2 in the standby state, the priority order searching unit 32A searches the state management table 21 to retrieve the standby content screen that has stopped being displayed on the display device 2 related to the usage starting operation. If the display device 2 of the usage starting operation is displaying split screens, the priority order searching unit 32A retrieves two or more standby content screens.

The priority order searching unit 32A further searches the priority order management table 24 to retrieve the priority levels corresponding to the standby content screens as the search results, and sets the highest priority level among the priority levels of the search results as the priority level of the display device 2 related to the usage starting operation.

The control unit 13 also includes: the split display target designating unit 33A that designates the display device 2 of the split display target to display, as a split screen, the standby content screen that has stopped being displayed on the display device 2 of the usage starting operation, based on the highest priority level of the standby content screens retrieved by the priority order searching unit 32A; and the display control unit 34A that causes the display device 2 of the split display target designated by the split display target designating unit 33A to display, as a split screen, the standby content screen that has stopped being displayed on the display device 2 related to the usage starting operation.

The split display target designating unit 33A searches the priority order management table 24 to retrieve the standby content screens that have lower priority levels or have lower degrees of importance than the highest priority level of the standby content screens retrieved by the priority order searching unit 32A, and retrieves the display devices 2 displaying the retrieved standby content screens of the lower priority levels from the state management table 21.

If there is only one display device 2 displaying the standby content screen of the lowest priority level among the retrieved display devices 2, the split display target designating unit 33A designates the only one display device 2 as the display device 2 of the split display target.

If there are two or more display devices 2 displaying the standby content screen of the lowest priority level among the retrieved display devices 2, the split display target designating unit 33A designates the display device 2 of the split display target that is the display device 2 located at the shortest distance from the display device 2 related to the usage starting operation among the two or more display devices 2, based on the table contents of the distance management table 22.

After the split display target designating unit 33A designates the display device 2 of the split display target, the display control unit 34A causes the display area of the touch panel display unit 2B of the designated display device 2 of the split display target to display, as a split screen, the standby content screen that has stopped being displayed on the display device 2 related to the usage starting operation, as well as the standby content screen the display device 2 of the split display target is currently displaying.

Figure 10:
FIG. 10 is a diagram for briefly explaining the table contents of the state management table stored in the storage unit of the display control device according to the second embodiment.

After the display control unit 34A causes the display device 2 of the split display target to display, as a split screen, the standby content screen that has stopped being displayed on the display device 2 related to the usage starting operation, as well as the standby content screen the display device 2 of the split display target is currently displaying, the state monitor and control unit 31 registers the display content information about the standby content screens being displayed as split screens on the display device 2 of the split display target in the state management table 21, as illustrated in FIG. 10. By doing so, the state monitor and control unit 31 updates the state management table 21.

Based on the table contents of the state management table 21, the control unit 13 can recognize that the usage state of the display device 2 of "A5" is "on standby", and the display device 2 is displaying the four standby content screens of "C4", "C3", "C2", and "C1" as split screens on the touch panel display unit 2B.

The control unit 13 also includes the display recovery content searching unit 35A, instead of the display recovery content searching unit 35. When detecting a usage ending operation on the side of a display device 2 in the "in-use" state through the state monitor and control unit 31, the display recovery content searching unit 35A retrieves the standby content screen to be displayed on the display device 2 related to the usage ending operation.

When detecting a usage ending operation on the side of a display device 2 in the "in-use" state, the display recovery content searching unit 35A retrieves the display device 2 displaying split screens from the table contents of the state management table 21, and retrieves the standby content screens of the highest priority level among the standby content screens being currently displayed as split screens on the display device 2.

The display control unit 34A causes the display device 2 of the usage ending operation to display the standby content screen of the highest priority level retrieved by the display recovery content searching unit 35A.

The structure according to the second embodiment has been described so far, and the correspondence between the components of the second embodiment and the components claimed in the claims is now described. The content display system in the claims is equivalent to the content display system 1, the display devices are equivalent to the display devices 2, the display control device is equivalent to the display control device 4, the priority order managing unit is equivalent to the priority order management table 24, the state managing unit is equivalent to the state management table 21, the priority order searching unit is equivalent to the priority order searching unit 32A, the display target designating unit is equivalent to the split display target designating unit 33A, the display control unit is equivalent to the display control unit 34A, the distance managing unit is equivalent to the distance management table 22, and the display recovery content searching unit is equivalent to the display recovery content searching unit 35A.

Figure 11:
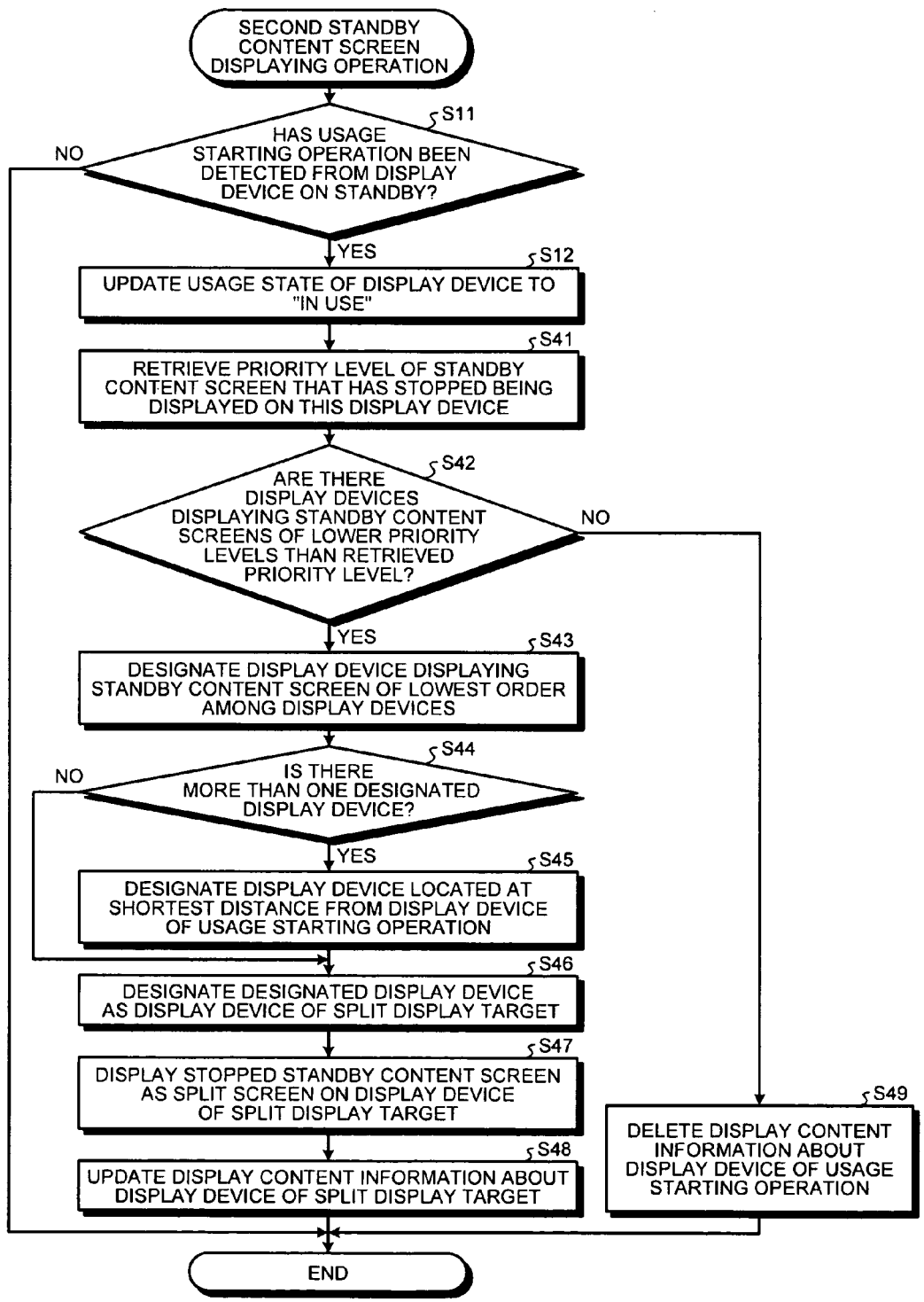
FIG. 11 is a flowchart illustrating the procedures to be carried out by the control unit involved in a second standby content screen displaying operation of the display control device according to the second embodiment.

Next, the operation of the content display system 1 according to the second embodiment is described. FIG. 11 is a flowchart illustrating the procedures to be carried out by the control unit 13 involved in a second standby content screen displaying operation of the display control device 4 according to the second embodiment.

The second standby content screen displaying operation illustrated in FIG. 11 is an operation to display, as a split screen, the standby content screen that has stopped being displayed on a display device 2 due to a usage starting operation on the display device 2 in the "standby" state, on a display device 2 displaying a standby content screen of a lower priority level than the stopped standby content screen.

In FIG. 11, after the procedures of steps S11 and S12, the priority order searching unit 32A in the control unit 13 searches the state management table 21 to retrieve the standby content screen that has stopped being displayed on the display device 2 related to the usage starting operation, and then searches the priority order management table 24 to retrieve the priority level corresponding to the retrieved standby content screen (step S41).

In a case where the display device 2 of the usage starting operation is displaying split screens, the priority order searching unit 32A retrieves two or more priority levels corresponding to the standby content screens, and therefore, obtains the highest priority level among those priority levels as a search result.

After obtaining the search result indicating the priority level of the standby content screen that has stopped being displayed, the split display target designating unit 33A in the control unit 13 searches the priority order management table 24 to retrieve the standby content screens of lower priority levels than the priority level of the stopped standby content screen, and then searches the state management table 21 to retrieve the display devices 2 currently displaying the retrieved standby content screens of lower priority levels. Based on the search result, the split display target designating unit 33A determines whether there are display devices 2 currently displaying the standby content screens of lower priority levels (step S42).

If there are display devices 2 currently displaying the standby content screen of lower priority levels ("Yes" in step S42), the split display target designating unit 33A designates the display device 2 displaying the standby content screen of the lowest priority level among those display devices 2 (step S43).

After designating the display device 2 displaying the standby content screen of the lowest priority level, the split display target designating unit 33A determines whether there are two or more designated display devices 2 (step S44).

If there two or more designated display devices 2 ("Yes" in step S44), the split display target designating unit 33A designates the display device 2 located at the shortest distance from the display device 2 related to the usage starting operation of step S11, based on the table contents of the distance management table 22 (step s45).

If there is only one display device 2 designated in step S44 ("No" in step S44), or if the display device 2 located at the shortest distance from the display device 2 related to the usage starting operation is designated in step S45, the split display target designating unit 33A designates this designated display device 2 as the display device 2 of the split display target (step S46).

The display control unit 34A in the control unit 13 causes the display device 2 of the split display target to display, as a split screen, the standby content screen that has stopped being displayed on the display device 2 related to the usage starting operation of step S11, as well as the standby content screen the display device 2 of the split display target is currently displaying (step S47).

As a result, even if a standby content screen stops being displayed on a display device 2 due to a usage starting operation on the display device 2, the standby content screen can be displayed as a split screen on the display device 2 of the split display target.

After the standby content screen is displayed as a split screen on the display device 2 of the split display target, the state monitor and control unit 31 registers the standby content screens being displayed as split screens on the display device 2 of the split display target in the display content information corresponding to the display device 2 of the split display target in the state management table 21. By doing so, the state monitor and control unit 31 updates the state management table 21 (step S48), and then ends this operation.

If there is not a display device 2 currently displaying a standby content screen of a lower priority level in step S42 ("No" in step S42), the split display target designating unit 33A deletes the display content information corresponding to the display device 2 of the usage starting operation in the state management table 21. By doing so, the split display target designating unit 33A updates the state management table 21 (step S49), and then ends this operation.

In the second standby content screen displaying operation illustrated in FIG. 11, when a usage starting operation is detected from a display device 2 in the "standby" state, the priority level of the standby content screen being displayed on this display device 2 is retrieved. If there are display devices 2 displaying standby content screens of lower priority levels than the retrieved priority level, the display device 2 displaying the standby content screen of the lowest priority level among those display devices 2 is designated as the display device 2 of the split display target. The standby content screen that has stopped being displayed due to the usage starting operation is then displayed as a split screen on the designated display device 2. Accordingly, even in a case where only one display device 2 is displaying a standby content screen of a high priority level, and the standby content screen of the high priority level stops being displayed on the display device 2 due to a usage starting operation on the display device 2, the opportunities for viewing the stopped standby content screen on the users' side can be secured with certainty by another display device 2 displaying the stopped standby content screen as a split screen.

Also, in the second standby content screen displaying operation, when a usage starting operation is detected from a display device 2 in the "standby" state, the priority level of the standby content screen being displayed on this display device 2 is retrieved. If there are display devices 2 displaying standby content screens of lower priority levels than the retrieved priority level, a check is made to determine whether there is more than one display device 2 displaying the standby content screen of the lowest priority level among those display devices 2. If there is more than one display device 2, the display device 2 located at the shortest distance from the display device 2 related to the usage starting operation is designated as the display device 2 of the split display target. The standby content screen that has stopped being displayed due to the usage starting operation is then displayed as a split screen on the designated display device 2. Accordingly, even in a case where only one display device 2 is displaying a standby content screen of a high priority level, and the standby content screen stops being displayed on the display device 2 due to a usage starting operation on the display device 2, it is possible to secure with certainty the opportunities for viewing the standby content screen of the high priority level on the users' side through the display device 2 located at the shortest distance from the display device 2 that has ended the subject display.

Figure 12:
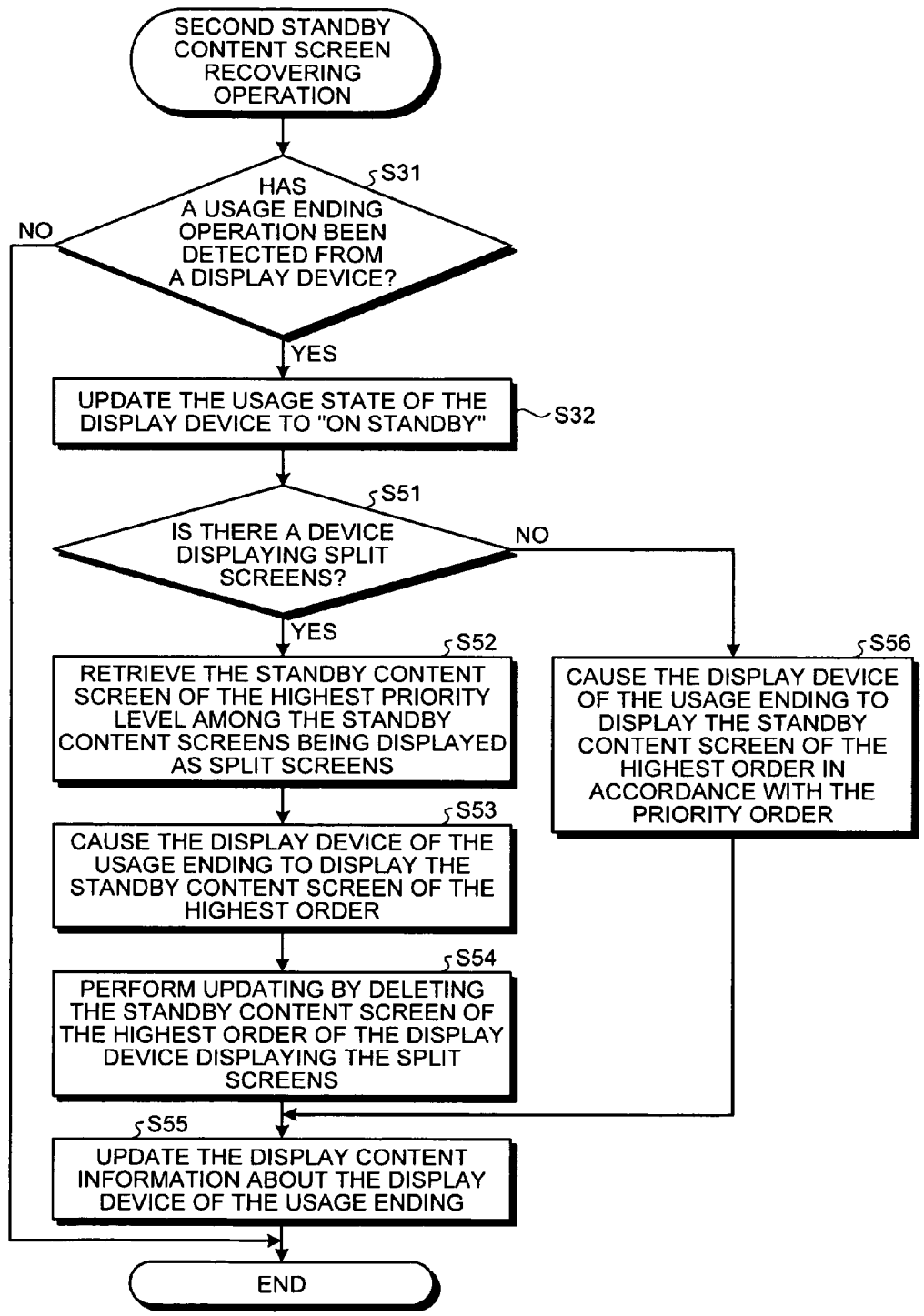
FIG. 12 is a flowchart illustrating the procedures to be carried out by the control unit involved in a second standby content screen recovering operation of the display control device according to the second embodiment.

FIG. 12 is a flowchart illustrating the procedures to be carried out by the control unit 13 involved in a second standby content screen recovering operation of the display control device 4 according to the second embodiment.

The second standby content screen recovering operation illustrated in FIG. 12 is an operation to recover a standby content screen on a display device 2, when the display device 2 shifts from "in use" to "on standby" due to a usage ending operation detected from the display device 2 in the "in-use" state.

In FIG. 12, after the procedures of steps S31 and S32 are carried out, the display recovery content searching unit 35A in the control unit 13 determines whether there is a display device 2 displaying split screens, based on the display content information in the state management table 21 illustrated in FIG. 10 (step S51).

If there is a display device 2 displaying split screens ("Yes" in step S51), the display recovery content searching unit 35A retrieves the standby content screen of the highest priority level among the standby content screens being displayed as split screens on the display device 2, based on the table contents of the priority order management table 24 (step S52).

After the standby content screen of the highest priority level is retrieved, the display control unit 34A causes the display device 2 related to the usage ending operation to display the standby content screen of the highest priority level (step S53).

After the standby content screen is displayed on the display device 2 related to the usage ending operation, the state monitor and control unit 31 deletes the standby content screen corresponding to the display device 2 displaying the standby content screen of the highest priority level as a split screen from the state management table 21. By doing so, the state monitor and control unit 31 updates the state management table 21 (step S54).

Since the standby content screen is displayed on the display device 2 related to the usage ending operation, the state monitor and control unit 31 further registers the currently displayed standby content screen in the display content information corresponding to the display device 2 related to the usage ending operation in the state management table 21. By doing so, the state monitor and control unit 31 updates the state management table 21 (step S55), and ends this operation.

If there is not a display device 2 displaying split screens in step S51 ("No" in step S51), the display recovery content searching unit 35A causes the display device 2 of the usage ending operation to display the standby content screen of the highest level in accordance with the priority order (step S56), and then moves on to step S55 to register the currently displayed standby content screen in the display content information corresponding to the display device 2 related to the usage ending operation in the state management table 21.

In the procedure of step S56, the standby content screen of the highest priority level is displayed on the display device 2 of the usage ending operation in accordance with the priority order, since all the standby content screens are being displayed on the display devices 2 on "standby". However, this selection of standby content may be arbitrarily changed.

In the second standby content screen recovering operation illustrated in FIG. 12, when a usage ending operation is detected from a display device 2 in the "in-use" state, a check is made to determine whether there is a display device 2 displaying standby content screens as split screens. If there is a display device 2 displaying split screens, the standby content screen of the highest priority level among the standby content screens being displayed as the split screens is displayed on the display device 2 of the usage ending operation. Accordingly, the standby content screen of the highest priority level among the standby content screens being displayed as the split screens can be displayed as the regular-sized screen. In this manner, the opportunities for viewing the standby content screen of the highest priority level on the users' side can be greatly increased.

Also, in the second standby content screen recovering operation, when a usage ending operation is detected from a display device 2 in the "in-use" state, a check is made to determine whether there is a display device 2 displaying standby content screens as split screens. If there is not a display device 2 displaying split screens, the standby content screen of the highest priority level is displayed on the display device 2 of the usage ending operation in accordance with the priority order. Accordingly, the opportunities for viewing the standby content screen that has the highest priority level or has the highest degree of importance on the users' side can be greatly increased.

Figure 13:
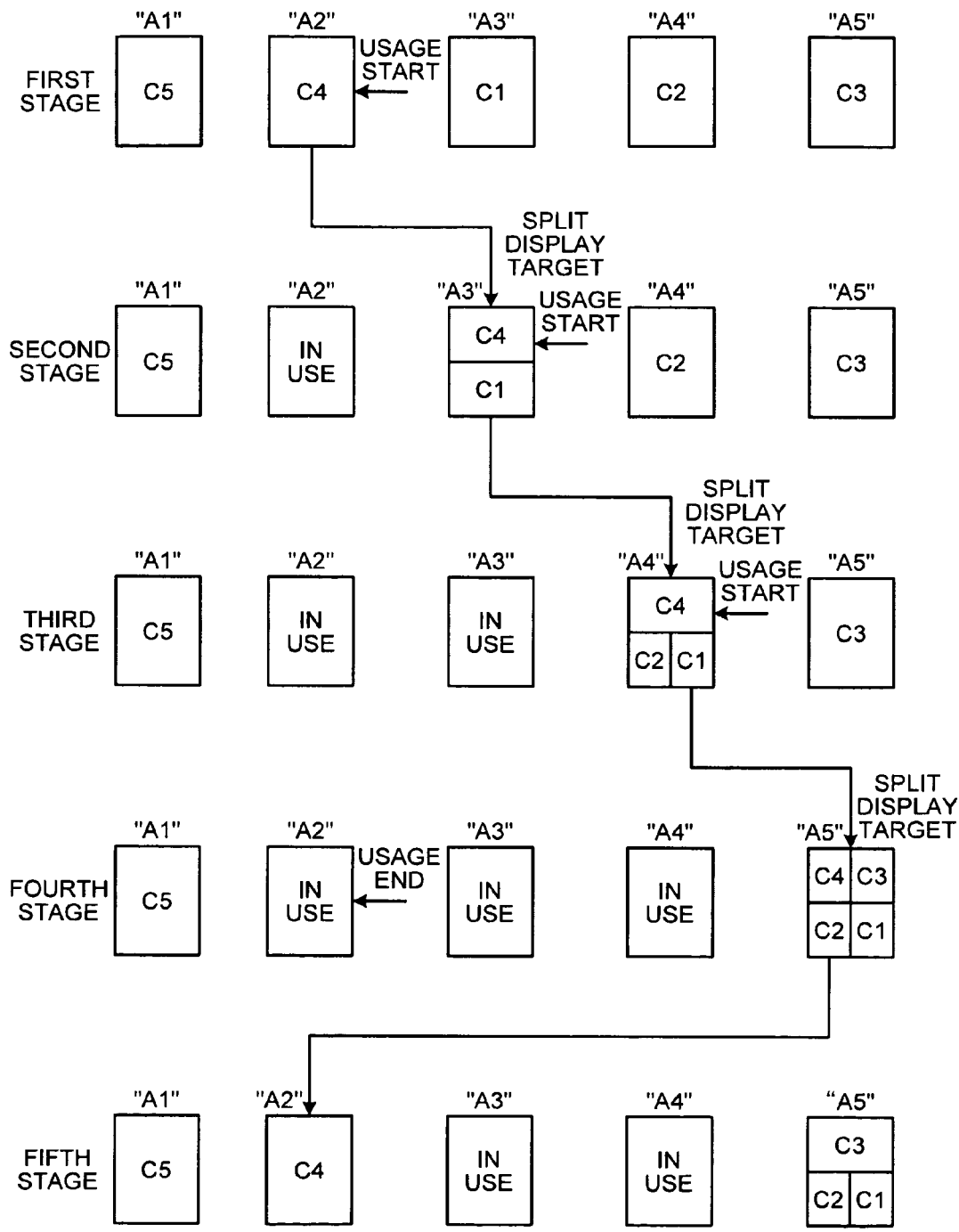
FIG. 13 is a diagram for briefly explaining the transition process of the standby content screens to be displayed on the respective display devices involved in the second standby content screen displaying operation and the second standby content screen recovering operation of the display control device according to the second embodiment.

The procedures in the second standby content screen displaying operation illustrated in FIG. 11 and the second standby content screen recovering operation illustrated in FIG. 12 are now described in conjunction with the display forms of the respective display devices 2. FIG. 13 is a diagram for briefly explaining standby content screen transition processes of the respective display devices 2 in the second standby content screen displaying operation and the second standby content screen recovering operation according to the second embodiment.

As illustrated in FIG. 13, in this system, the standby content screen of "C5" is displayed on the display device 2 of "A1", the standby content screen of "C4" is displayed on the display device 2 of "A2", the standby content screen of "C1" is displayed on the display device 2 of "A3", the standby content screen of "C2" is displayed on the display device 2 of "A4", and the standby content screen of "C3" is displayed on the display device 2 of "A5", for example. The usage states of all the display devices 2 of "A1" through "A5" are "on standby", and the priority order of the standby content screens is "C5"→"C4"→"C3"→"C2"→"C1" in descending order.

First, when detecting a usage starting operation on the display device 2 of "A2" in the first stage, the display control device 4 obtains search results that indicate the display devices 2 displaying the standby content screens of lower priority levels than the standby content screen "C4" being displayed on the display device 2 of "A2" or the standby content screens of "C3", "C2" and "C1", or the display devices 2 of "A3", "A4", and "A5".

The display control device 4 then obtains a search result that indicates the display device 2 displaying the standby content screen of the lowest priority level or the standby content screens of "C1", or the display device 2 of "A3" among the display devices 2 of "A3", "A4", and "A5".

Since there is only a single search result, the display control device 4 further designates the display device 2 of "A3" as the display device 2 of the split display target. The display control device 4 then causes the display device 2 of "A3" as the split display target to display not only the standby content screen of "C1" being currently displayed but also the standby content screen of "C4" that has stopped being displayed on the display device 2 related to the usage starting operation or the display device 2 of "A2" (see SECOND STAGE).

As a result, the display device 2 of "A3" can secure not only the standby content screen "C1" but also the standby content screen of "C4" that has stopped being displayed, by displaying as a split screen the standby content screen of "C4" that has stopped being displayed due to the usage starting operation.

When detecting a usage starting operation on the display device 2 of "A3" in the second stage, the display control device 4 obtains search results that indicate the display devices 2 displaying the standby content screens of lower priority levels than the standby content screen "C4" being displayed on the display device 2 of "A3" or the standby content screens of "C3" and "C2", or the display devices 2 of "A4" and "A5".

The display control device 4 then obtains a search result that indicates the display device 2 displaying the standby content screen of the lowest priority level or the standby content screen of "C2" between the display devices 2 of "A4" and "A5", or the display device 2 of "A4".

Since there is only a single search result, the display control device 4 further designates the display device 2 of "A4" as the display device 2 of the split display target. The display control device 4 then causes the display device 2 of "A4" as the split display target to display not only the standby content screen of "C2" being currently displayed but also the standby content screens of "C4" and "C1" that have stopped being displayed on the display device 2 related to the usage starting operation or the display device 2 of "A3" (see THIRD STAGE).

As a result, the display device 2 of "A4" can secure not only the standby content screen of "C2" but also the standby content screens of "C4" and "C1" that have stopped being displayed, by displaying as split screens the standby content screens of "C4" and "C1" that have stopped being displayed due to the usage starting operation.

When detecting a usage starting operation on the display device 2 of "A4" in the third stage, the display control device 4 obtains a search result that indicates the display device 2 displaying the standby content screen of lower priority level than the standby content screen "C4" being displayed on the display device 2 of "A4" or the standby content screen of "C3", or the display device 2 of "A5".

Since there is only a single search result, the display control device 4 further designates the display device 2 of "A5" as the display device 2 of the split display target. The display control device 4 then causes the display device 2 of the split display target or the display device 2 of "A5" to display not only the standby content screen of "C3" being currently displayed but also the standby content screens of "C4", "C2", and "C1" that have stopped being displayed on the display device 2 related to the usage starting operation or the display device 2 of "A4" (see FOURTH STAGE).

As a result, the display device 2 of "A5" can secure not only the standby content screen of "C3" but also the standby content screens of "C4", "C2", and "C1" that have stopped being displayed, by displaying as split screens the standby content screens of "C4", "C2", and "C1" that have stopped being displayed due to the usage starting operation.

When detecting a usage ending operation on the display device 2 of "A2" "in use" in the fourth stage, the display control device 4 obtains a search result that indicates the standby content screen of the highest priority level among the standby content screens being displayed as split screen on the display device 2 of "A5", or the standby content screen of "C4".

The display control device 4 then causes the display device 2 related to the usage ending operation or the display device 2 of "A2" to display the standby content screen of "C4", and deletes the standby content screen of "C4" from the display device 2 of "A5" displaying the standby content screen of "C4" as a split screen (see FIFTH STAGE). As a result, the display device 2 that has returned to the standby state displays the standby content screen of the highest priority level among the standby content being displayed as split screens.

According to the second embodiment, when a usage starting operation is detected from a display device 2 in the "standby" state, the priority level of the standby content screen being displayed on this display device 2 is retrieved. If there are display devices 2 displaying standby content screens of lower priority levels than the retrieved priority level, the display device 2 displaying the standby content screen of the lowest priority level among those display devices 2 is designated as the display device 2 of the split display target. The standby content screen that has stopped being displayed due to the usage starting operation is then displayed as a split screen on the designated display device 2. Accordingly, even in a case where only one display device 2 is displaying a standby content screen of a high priority level, and the standby content screen of the high priority level stops being displayed on the display device 2 due to a usage starting operation on the display device 2, the opportunities for viewing the stopped standby content screen on the users' side can be secured with certainty by another display device 2 displaying the stopped standby content screen as a split screen.

Also, according to the second embodiment, when a usage starting operation is detected from a display device 2 in the "standby" state, the priority level of the standby content screen being displayed on this display device 2 is retrieved. If there are display devices 2 displaying standby content screens of lower priority levels than the retrieved priority level, a check is made to determine whether there is more than one display device 2 displaying the standby content screen of the lowest priority level among those display devices 2. If there is more than one display device 2, the display device 2 located at the shortest distance from the display device 2 related to the usage starting operation is designated as the display device 2 of the split display target. The standby content screen that has stopped being displayed due to the usage starting operation is then displayed as a split screen on the designated display device 2. Accordingly, even in a case where only one display device 2 is displaying a standby content screen of a high priority level, and the standby content screen stops being displayed on the display device 2 due to a usage starting operation on the display device 2, it is possible to secure with certainty the opportunities for viewing the standby content screen of the high priority level on the users' side through the display device 2 located at the shortest distance from the display device 2 that has ended the subject display.

According to the second embodiment, when a usage ending operation is detected from a display device 2 in the "in-use" state, a check is made to determine whether there is a display device 2 displaying standby content screens as split screens. If there is a display device 2 displaying split screens, the standby content screen of the highest priority level among the standby content screens being displayed as the split screens is displayed on the display device 2 of the usage ending operation. Accordingly, the standby content screen of the highest priority level among the standby content screens being displayed as the split screens can be displayed as a regular-sized screen. In this manner, the opportunities for viewing the standby content screen of the highest priority level on the users' side can be greatly increased.

Also, according to the second embodiment, when a usage ending operation is detected from a display device 2 in the "in-use" state, a check is made to determine whether there is a display device 2 displaying standby content screens as split screens. If there is not a display device 2 displaying split screens, the standby content screen of the highest priority level is displayed on the display device 2 of the usage ending operation in accordance with the priority order. Accordingly, the opportunities for viewing the standby content screen that has the highest priority level or has the highest degree of importance on the users' side can be greatly increased.

In the above described second embodiment, standby content screens that have stopped being displayed are displayed as split screens on the display device 2 of the split display target. However, when the standby content screens that have stopped being displayed are displayed as split screens on the display device 2 of the split display target, the display area size on the touch panel display unit 2B that displays standby content screens in accordance with the priority order of the standby content screens to be displayed as split screens may of course be changed.

Also, in the above described first and second embodiments, the standby content screens are managed in the standby content screen database 23 in the display control device 4, and the display control device 4 causes each display device 2 to display a standby content screen being managed in the standby content screen database 23. However, the same effects as above can of course be achieved by providing a standby content screen database in each of the display devices 2, or providing another standby content screen database on the LAN 3.

Although the embodiments of the present invention have been described so far, those embodiments do not limit the technical spirit and scope of the invention, and other various embodiments may of course be formed within the claimed technical scope of the invention. The above described effects of those embodiments do not limit the effects of the invention.

Among the various procedures described in the above embodiments, all of or some of the procedures to be automatically carried out according to the above explanation may of course be manually carried out. On the other hand, all of or some of the procedures to be manually carried out according to the above explanation may of course be automatically carried out. The processes, control procedures, specific names, and information containing various kinds of data and parameters may of course be arbitrarily changed, unless otherwise specified.

Each of the components of each of the devices in the drawings is conceptually illustrated in terms of functions, and does not necessarily have the physical structure illustrated in the drawings. Specific forms of the respective devices are of course not limited to those illustrated in the drawings.

Furthermore, all of or some of the processing functions to be carried out in the respective devices may be carried out by a CPU (Central Processing Unit) (or a microcomputer such as a MPU (Micro Processing Unit) or a MCU (Micro Controller Unit), or in a program to be analyzed and executed by the CPU (or the microcomputer such as a MPU or a MCU), or in hardware through wired logics.

Accordingly, even if there is only one display device displaying a standby content screen of a high priority level, and the display of the standby content screen of the high priority level on the display device is ended due to a usage starting operation on the display device, the disclosed system can effectively secure the opportunities for viewing this standby content screen of the high priority level on the users' side.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A content display system comprising:
a plurality of display devices;
a display control device that controls the display devices to display any of a plurality of standby content screens on the respective display devices that are in a standby state, the display control device controlling the display devices to stop displaying a standby content screen being currently displayed when detecting a usage starting operation from the display devices;
a priority order managing unit that manages priority levels of standby content screens to be preferentially displayed on the display devices that are in the standby state;
a state managing unit that manages a usage state of each of the display devices, and manages a standby content screen being currently displayed when the usage state is the standby state;
a priority order searching unit that, when detecting a usage starting operation from the display device that is in the standby state, searches the state managing unit to retrieve a standby content screen that has stopped being displayed on the display device related to the usage starting operation, and searches the priority order managing unit to retrieve a priority level corresponding to the retrieved standby content screen;
a display target designating unit that searches the priority order managing unit to retrieve standby content screens of lower priority levels than the priority level of the standby content screen retrieved by the priority order searching unit, searches the state managing unit to retrieve display devices displaying the retrieved standby content screens of lower priority levels, and designates a display device of a display target that is a display device displaying the standby content screen of the lowest priority level among the retrieved display devices; and
a display control unit that controls the display device of the display target designated by the display target designating unit to display the standby content screen that has stopped being displayed on the display device related to the usage starting operation.

2. The content display system according to claim 1, further comprising a distance managing unit that manages distances between each of the display devices and the other ones of the display devices,
wherein, when there are a plurality of display devices displaying the standby content screen of the lowest priority level, the display target designating unit designates the display device of the display target that is a display device located at the shortest distance from the display device related to the usage starting operation, based on management contents of the distance managing unit.

3. The content display system according to claim 1, wherein the display control unit controls the display device of the display target designated by the display target designating unit to switchingly display the standby content screen that has stopped being displayed on the display device related to the usage starting operation.

4. The content display system according to claim 1, wherein the display control unit controls the display device of the display target designated by the display target designating unit to display not only the standby content screen being currently displayed on the display device of the display target, but also the standby content screen that has stopped being displayed on the display device related to the usage starting operation, the standby content screens being displayed as split screens.

5. The content display system according to claim 3, further comprising:
an undisplayed content managing unit that manages standby content screens not being displayed on the display devices among the standby content screens; and
a display recovery content searching unit that retrieves the standby content screen of the highest priority level among the standby content screens being managed by the undisplayed content managing unit, when a usage ending operation is detected from the display devices,
wherein the display control unit controls the display device related to the usage ending operation to display the standby content screen of the highest priority level retrieved by the display recovery content searching unit.

6. The content display system according to claim 4, further comprising a display recovery content searching unit that retrieves the standby content screen of the highest priority level among the standby content screens being displayed as the split screens, when a usage ending operation is detected from the display devices,
wherein the display control unit controls the display device related to the usage ending operation to display the standby content screen of the highest priority level retrieved by the display recovery content searching unit.

7. The content display system according to claim 4, wherein the display control unit sets a display area for displaying each standby content screen in accordance with priority levels of the standby content screens to be displayed as the split screens, when the standby content screens are to be displayed as the split screens on the display device of the display target designated by the display target designating unit.

8. The content display system according to claim 6, wherein the display control unit sets a display area for displaying each standby content screen in accordance with priority levels of the standby content screens to be displayed as the split screens, when the standby content screens are to be displayed as the split screens on the display device of the display target designated by the display target designating unit.

9. A content display method for controlling a plurality of display devices, controlling the respective display devices that are in a standby state to display any of a plurality of standby content screens, and controlling the display devices to stop displaying the standby content screen when detecting a usage starting operation from the display devices,
the content display method comprising:
managing priority levels of standby content screens to be preferentially displayed on the display devices that are in the standby state;
managing a usage state of each of the display devices, and managing a standby content screen being currently displayed when the usage state is the standby state;
searching the contents managed at the managing the usage state to retrieve a standby content screen that has stopped being displayed on the display device related to a usage starting operation when the usage starting operation is detected from any of the display devices that are in the standby state, and searching the contents managed at the managing the priority levels to retrieve a priority level corresponding to the retrieved standby content screen;
searching the contents managed at the managing the priority levels to retrieve standby content screens of lower priority levels than the standby content screen retrieved in the searching the priority levels, searching the contents managed at the managing the usage state to retrieve display devices displaying the standby content screens of the lower priority levels, and designating a display device of a display target that is a display device displaying a standby content screen of the lowest priority level among the retrieved display devices; and controlling the designated display device of the display target to display the standby content screen that has stopped being displayed on the display device related to the usage starting operation.

10. The content display method according to claim 9, further comprising managing distances between each of the display devices and the other ones of the display devices, wherein, when there are a plurality of display devices displaying the standby content screen of the lowest priority level, the display device of the display target that is a display device located at the shortest distance from the display device related to the usage starting operation is designated based on management contents of the managed distances.

11. The content display method according to claim 9, wherein the controlling the display control unit includes controlling the display device of the display target designated by the display target designating unit to switchingly display the standby content screen that has stopped being displayed on the display device related to the usage starting operation.

12. The content display method according to claim 9, wherein the controlling the display control unit includes controlling the display device of the designated display target to display not only the standby content screen being currently displayed on the display device of the display target, but also the standby content screen that has stopped being displayed on the display device related to the usage starting operation, the standby content screens being displayed as split screens.

13. The content display method according to claim 11, further comprising:

managing standby content screens not being displayed on the display devices among the standby content screens; and retrieving the standby content screen of the highest priority level among the standby content screens being managed at the managing the standby content screens not being displayed, when a usage ending operation is detected from the display devices, wherein the controlling the display control unit includes controlling the display device related to the usage ending operation to display the retrieved standby content screen of the highest priority level.

14. The content display method according to claim 12, further comprising retrieving the standby content screen of the highest priority level among the standby content screens being displayed as the split screens, when a usage ending operation is detected from the display devices, wherein the controlling the display device includes controlling the display device related to the usage ending operation to display the retrieved standby content screen of the highest priority level.

15. The content display method according to claim 12, wherein the controlling the display device includes setting a display area for displaying each standby content screen in accordance with priority levels of the standby content screens to be displayed as the split screens, when the standby content screens are to be displayed as the split screens on the display device of the display target designated at the designating.

16. The content display method according to claim 14, wherein the controlling the display device includes setting a display area for displaying each standby content screen in accordance with priority levels of the standby content screens to be displayed as the split screens, when the standby content screens are to be displayed as the split screens on the display device of the display target designated at the designating.

* * * * *